Figure 1:
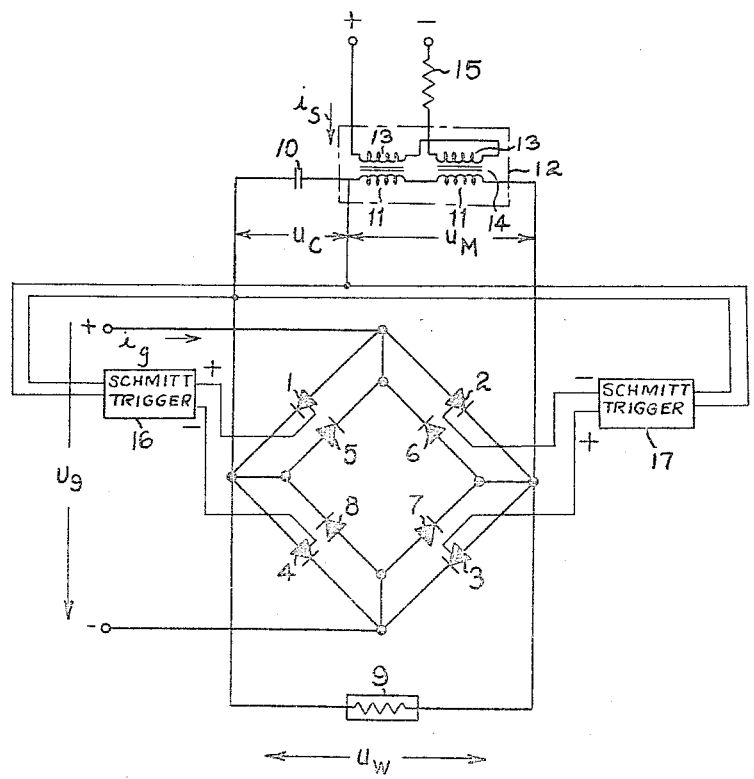

INVENTOR.
Manfred Depenbrock

INVENTOR.
Manfred Depenbrock

United States Patent Office 3,309,623
Patented Mar. 14, 1967

3,309,623
SELF-COMMUTATING AND AUTOMATICALLY CONTROLLED INVERTER
Manfred Depenbrock, Mannheim-Almenhof, Germany, assignor to Aktiengesellschaft Brown, Boveri & Cie, Baden, Switzerland, a joint-stock company
Filed Apr. 27, 1966, Ser. No. 554,238
2 Claims. (Cl. 331—113)

The present invention relates to inverters of the self-commutating type which are controlled automatically, and is a continuation-in-part of my application Ser. No. 367,958, filed May 18, 1964, now abandoned.

As is known, a self-commutating inverter of this type usually requires special components which determine the wave form of the alternating voltage which is generated through the inverter from a supply source of unidirectional current and assure the proper commutating process necessary for extinction of the controlled valves employed in the converter. These special components usually consist of capacitors and impedance coils, and wherein the latter are dispensible, if an ohmic and inductive load is involved. But such inverter units have the disadvantage that the magnitude and wave form of the generated alternating voltage is dependent upon the load. Likewise, the so-called non-conducting time of the controlled valves, which determines the re-establishment of the blocking ability of the respective relieved valve, depends upon the load. These disadvantages can be eliminated by providing special auxiliary circuits with additional controlled valves. However, this necessitates considerable expense.

In another suggested arrangement for an inverter circuit which includes a capacitor in series with the alternating current load, and in which uncontrolled valves are arranged anti-parallel, i.e. in back-to-front parallel relation, with the controlled valves, the impedance, if necessary supplemented by additional inductances, is dimensioned so as to create an oscillation circuit which has a period of oscillation slightly below the oscillation time of the alternating current to be generated by the inverter. This type of inverter has the characteristic that the non-conducting time of the controllable valves is independent of the load. However, the magnitude of the starting voltage, as well as the frequency of this voltage are variable with the load due to the fact that the components of the oscillation circuit vary with the variation in load.

These various disadvantages are avoided by means of the present invention wherein it is possible to so construct the inverter that, without the necessity for providing additional valve circuits, the magnitude of the starting voltage does not depend upon the load and in which, up to a certain load limit, the frequency of the starting voltage and the non-conducting time of the controlled valves also do not depend upon the load. The improved inverter circuit is so constructed as to furnish an output alternating voltage wave having a rectangular configuration and in which independence of the wave form of this alternating voltage from the type of load is assured.

More particularly, the invention is directed to an improved inverter construction which is self-commutating and automatically controlled, having controllable valves arranged, for example, in each of the four legs of a full wave bridge supplied from a source of unidirectional voltage, each of these controllable valves being paralleled by another, non-controllable valve connected in back-to-front relation, i.e. anti-parallel. The alternating current load taken from the inverter bridge can be either of the ohmic, inductive, or capacitative type, and this load is paralleled by another and essential load which is constituted by a capacitor and the working coil or coils of a magnetic amplifier connected in series, and the magnetic amplifier is controlled by means of a secondary source of direct current. Moreover, the controllable valves in the inverter bridge are controlled by voltage pulses whose phase position is derived from the zero passages of the capacitor voltage.

Figure 2:
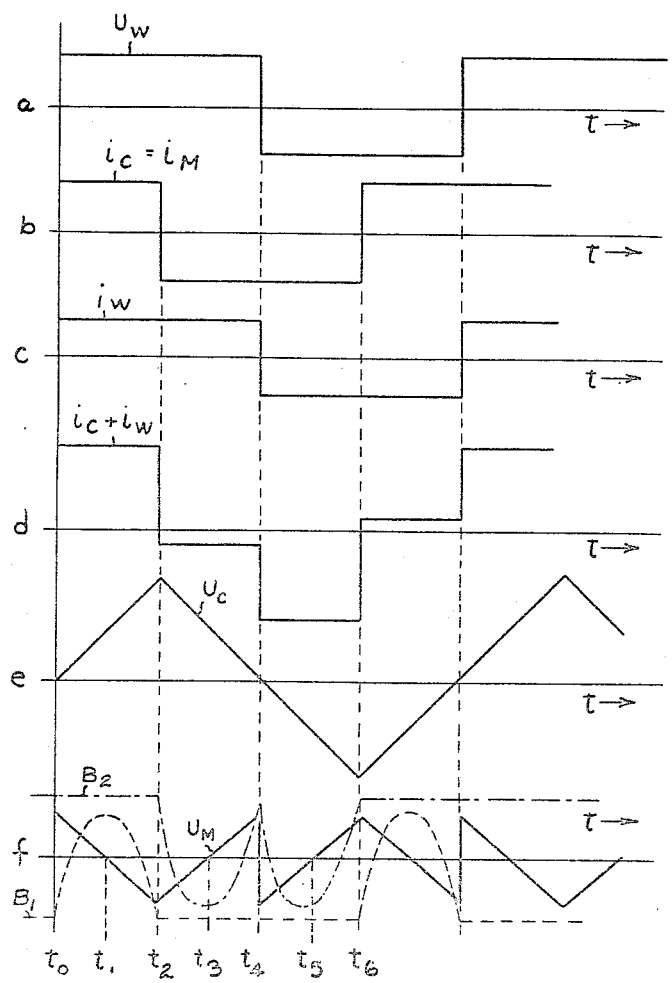

One suitable embodiment of the invention will now be described and is illustrated in the accompanying drawings wherein:

FIG. 1 is an electrical schematic diagram of the improved bridge-type inverter construction; and FIG. 2 is composed of a series of curves in explanation of the time and amplitude relationships as between the various voltage, current and magnetic quantities involved in operation of the inverter circuit.

With reference now to FIG. 1, the inverter circuit which is two-pulsed, self-commutating and automatically controlled, is comprised of four controllable semi-conductor valves 1, 2, 3, 4 of so-called four-layer construction, each of which has the control characteristic of a gas discharge type thyratron. These four valves are arranged respectively in the four legs of a single-phase full wave bridge circuit. Arranged in parallel, back-to-front relation with each of these controllable valve i.e. in anti-parallel therewith, is a semiconductor valve of the non-controllable type and these are designated 5, 6, 7 and 8 respectively.

Power to supply the inverter bridge is furnished from a suitable source of unidirectional voltage $U_g$ designated by the usual (+) and (−) symbols. In the illustrated example, the load supplied by the inverter is an ohmic one represented by resistance unit 9. The instantaneous value of the alternating voltage occurring at this resistance unit is designated $U_w$.

Connected in parallel with the inverter load 9, in accordance with the invention, is a base load which comprises a series connected capacitor 10 and two working coils 11, 11 of a magnetic amplifier unit 12. The latter which is often referred to as a transductor, comprises two so-called modulating chokes each of which includes one of the working coils 11 referred to, these latter being the "primary" coils of the amplifier, and a "secondary" coil 13 which serves as a control coil. The schematically illustrated magnetic cores 14 of the amplifier unit preferably have a rectangular hysterisis loop. The primary coils 11, 11 are series connected in the same sense while the two control coils 13, 13 are series connected in an opposing sense. These two modulating chokes function as a current-controlling magnetic amplifier. For this purpose the two "secondary" control coils 13, 13 are connected to an auxiliary source of a unidirectional voltage, also designated by the usual (+) and (−) symbols through a resistance unit 15. Through this latter, the auxiliary direct current $i_s$ effective as the regulating direct current is to be maintained.

In its working coils 11, 11 the magnetic amplifier brings about an alternating current of rectangular wave form, and wherein the amplitude of the half-waves of the current is determined by the regulating direct current $i_s$. Magnetic reversal of the modulating choke of the magnetic amplifier unit occurs in accordance with the voltage-time area of the voltages at these coils.

The sum of the voltage, designated as $U_m$ of the combined working coils 11, 11 of the modulating chokes and of the capacitor voltage $U_c$ in series, again coincides with the alternating voltage $U_w$ of the inverter occurring at the load resistance unit 9.

The base load of the inverter, formed by the magnetic amplifier 12 and the capacitor 10 in series serves to force the zero passage of the valve currents required for the respective extinction of the valves of the bridge circuit to be relieved, and to assure a sufficiently long-non-conducting time of the valves. Extinction of the valves is limited only by a secondary condition that the load current of the inverter at resistance unit 9 must be smaller than the base load current.

The mode of operation of the improved inverter construction is shown graphically in the curve family of FIG. 2. In this view several time periods marked at time instants $t_0, t_1 \ldots t_6$ are designated. The two controllable semi-conductor valves 1, 3 are to be made conductive at time instant $t_0$ and the two other controllable valves 2, 4 are to be made conductive at the time instant $t_4$. "Ignition," i.e. conduction of the controllable valves 1–4 is made to take place by means of two control units 16, 17 in dependence upon the zero passage of the voltage $U_c$ of capacitor 10. These control units having the voltage $U_c$ as inputs can be of the well known Schmitt trigger arrangement. When the voltage $U_c$ drops and passes through zero, the Schmitt trigger tips from one stable position to the other, and the signal at its output changes its sign. When the voltage then rises again from zero, the Schmitt trigger tips back again into its former position. Signals are therefore produced at the outputs of the Schmitt triggers 16, 17, namely a positive signal, for example, when the voltage $U_c$ at capacitor 10 becomes smaller, and a negative signal when it becomes greater. These two signals have a phase displacement of 180°. The positive signal then ignites for example, the controlled rectifiers 1 and 3, and the negative signal, the controlled rectifiers 2 and 4.

The alternating voltage $U_w$ of the inverter originating under these circumstances and occurring at resistance unit 9 and whose amplitude of half waves coincides with the unidirectional voltage $U_g$ of the direct current supply source of the inverter, is represented in FIG. 2 by curve $a$. The alternating current $i_w$ flowing through resistance unit 9 in accord with and proportional to this voltage, is represented by curve $c$.

In the working coils of the magnetic amplifier which are constituted by the series-connected coils 11, 11, the current represented by curve $b$, and designated as $i_m$ flows, and which coincides with current $i_c$ of capacitor 10. The current, in accordance with its rectangular wave form, is constant at times and changes its sense as soon as the voltage-time area, which the respective coil of the magnetic amplifier unit is capable of absorbing, is exceeded. The capacitor voltage $U_c$, represented by curve $e$ accordingly either rises or falls in a linear manner and has the form of a sawtooth. The accompanying voltage $U_m$ as measured across the series connected coils 11, 11 of the magnetic amplifier unit, which results from the difference between the alternating voltage $U_w$ and the capacitor voltage $U_c$, is represented by curve $f$. To those parts of curve $U_m$ which decline in a linear manner belong a positive half-wave of current $i_m$, and to the curve parts which rise linearly belong a negative half-wave of this current.

If B is the magnetic inductance in the respective magnetic core of the amplifier unit 12, then according to the law of induction $U_m = -K db/dt$, wherein K denotes a constant.

Accordingly, the inductance is approximately parabolic and in the first time period from $t_0$ to $t_2$, the positive maximum of B coincides with the zero passage of $U_m$ at $t_1$ and in the time period immediately following from $t_2$ to $t_4$, the occurring negative maximum of B coincides with the next zero passage of $U_m$ at $t_3$.

Assuming that at the instant $t_0$ both modulating chokes of the magnetic amplifier unit 12 are saturated, a magnetic reversal takes place in the period from $t_0$ to $t_1$ in one of the two modulating chokes, for instance, from the negative saturation to the aforementioned positive maximum of the inductance B and from $t_1$ to $t_2$ the back magnetization which ends again with negative saturation at $t_2$. The amplitude of the positive inductance B is determined by the voltage-time area of $U_m$. The progress of B is indicated in FIG. 2 by curve $f$ in the dashed line.

From time instant $t_2$ on, the respective modulating choke can no longer absorb a voltage. Therefore, as may be seen from curve $b$, at the instant $t_2$ the current $i_m = i_c$ jumps from a positive to a negative value, and now the second modulating choke is conditioned to absorb a voltage. The capacitor voltage decreases linearly.

As may be seen from curve $d$, the total current $i_c$ plus $i_w$ flowing through valves 1 and 3 jumps from the heretofore positive value to a negative value. With its zero passage the current extinguishes in the controlled valves 1 and 3 without commutation. The negative current $i_c$ plus $i_w$ is from now on taken over by the anti-parallel connected uncontrolled valves 5 and 7. This condition remains until, at time instant $t_4$, the controlled valves 2 and 4 are rendered conductive, and by means of which the uncontrolled valves 5 and 7 are relieved.

In the meantime, the polarity of the voltage on capacitor 10 has changed which, in conjunction with the change in load voltage, leads to the observation that from now on, the voltage conditions of the first time period from $t_0$ to $t_4$ prevail, only the sense of the voltages having changed, so that all processes repeat themselves logically in the manner already explained.

The mode of operation peculiar to the inverter, the supply of a rectangular alternating voltage, the extinction of the valves independent of the load up to a certain load limit without occurrence of a negative blocking voltage, and the maintenance of a sufficiently long non-conducting time of the valves do not depend on the kind of load. Thus the improved inverter is equally well usable for supplying an inductive or capacitive alternating current load.

I claim:
1. A self-commutating and automatically controlled inverter comprising a full-wave bridge of four legs in each of which is inserted a controllable valve paralleled by a non-controllable valve connected in back-to-front relation, a source of unidirectional voltage connected to the input of said bridge, a load element connected to the output of said bridge, a base load circuit connected in parallel with said load element, said base load circuit including a capacitor connected in series with the primary coils of a magnetic amplifier unit, a source of unidirectional voltage connected to the secondary coils of said magnetic amplifier unit, and means controlling the conduction of said controllable valves by voltage impulses whose phase position is derived from the zero passage of the capacitor voltage of the base load.

2. A self-commutating and automatically controlled inverter as defined in claim 1 wherein said magnetic amplifier unit includes two choke units each of which includes one of said primary coils and one of said secondary coils, said primary coils being connected in series in the same sense and said secondary coils being connected together in series opposition.

No references cited.

ROY LAKE, *Primary Examiner.*

J. KOMINSKI, *Assistant Examiner.*